United States Patent [19]
Wellinghoff et al.

[11] Patent Number: 4,849,140
[45] Date of Patent: Jul. 18, 1989

[54] METHOD FOR PRODUCING MONOSIZED CERAMIC PARTICLE THROUGH ORGANOMETALLIC SWOLLEN LATEX PARTICLES

[75] Inventors: Stephen T. Wellinghoff; Stuart T. Schwab; Carlos D. Herrera, all of San Antonio, Tex.

[73] Assignee: Southwest Research Institute, San Antonio, Tex.

[21] Appl. No.: 83,261

[22] Filed: Aug. 5, 1987

[51] Int. Cl.[4] ............................................. B29B 9/00
[52] U.S. Cl. ........................................ 264/9; 264/44; 423/592; 502/8
[58] Field of Search ................... 264/9, 63, 44; 502/8; 423/592

[56] References Cited

U.S. PATENT DOCUMENTS

| | | | |
|---|---|---|---|
| 3,463,842 | 8/1969 | Flack et al. | 264/9 |
| 3,674,736 | 7/1972 | Lerman et al. | 264/9 |
| 4,256,676 | 3/1981 | Kovach | 264/9 |

Primary Examiner—James Derrington
Attorney, Agent, or Firm—Thomas E. Sisson

[57] ABSTRACT

Monosized ceramic particles produced through synergistic combination of monosized latex particles and organometallic reagents in a solvent system. By swelling a poly(vinyltoluene) or other monosized latex with an appropriate organometallic reagent, decomposing the organometallic to ceramic within the latex vehicle, and then removing the latex polymer through thermolysis, monosized ceramic particles are produced. The swelling of the monosized latex particles with the organometallic reagent requires the judicious selection of a solvent system specific to the latex polymer and organic being employed.

5 Claims, No Drawings

METHOD FOR PRODUCING MONOSIZED CERAMIC PARTICLE THROUGH ORGANOMETALLIC SWOLLEN LATEX PARTICLES

BACKGROUND OF THE INVENTION

Ceramics are being widely considered for replacement of metals and polymers in many applications. Their corrosion resistance, small coefficients of thermal expansion, light weight, low cost, and in many cases, high strength at high temperature, make them very attractive in microelectronics, structural, and biotechnology areas.

Despite their desirable properties, ceramics are quite brittle and difficult to produce. Current processes involve preparations of small particles, transferral to a mold while suspended in a fluid vehicle, removal of the fluid, and subsequent sintering at high temperature to densify the ceramic. Presently, only limited methods are available to control particle size, composition, and surface properties. Nonuniformities in particle size make sintering difficult and result in internal flaws which weaken the final ceramic body. Ceramics with structural strengths in excess of those now in existence can be developed if improved ceramic powder technologies can be devised to produce ceramics characterized by fewer and smaller defects.

The manufacture of ceramic bodies reaching theoretical density requires sintering of a particulate compact or green body. Any pores remaining will act as stress concentrators and will promulgate premature fracture of the ceramic body. Pores much larger than the original particle size will form between particle aggregates in the green body. These large pores are difficult to remove and will frequently grow at the expense of smaller pores between well-packed particles. Only if the number of particles that surround a void (coordination number) is smaller than a critical value will these voids shrink under reasonable hydrostatic sintering pressures.

It is suspected that the primary source of the defects and the low bulk density is the presence of a widely scattered particle size distribution. Work with analogous polystyrene "monodisperse" spheres indicates that line defects and vacancies invariably nucleate at particles much larger or smaller than the average. Line defects are especially serious since they can disrupt packing over tens of particle diameters. Rigorous removal of particles at extreme ends of the size distribution would be a first step toward improving ordered green body packing.

The usual method of preparing fine particle oxide salts from oxalates, acetates, and carbonates is to thermally decompose, pyrolyze, or hydrolyze them to their oxides. A recently developed method based on the controlled precipitation of oxides from solutions of appropriate water reactive metal alkoxides has been the most successful to date in producing unagglomerated spherical particles with a diameter of approximately $0.2\mu$. Unfortunately, the size dispersion of the particles is no better than $\pm 10\%$.

Many of today's newest and most promising ceramics, such as silicon nitride ($Si_3N_4$) or silicon carbide (SiC) are not processible by controlled hydrolysis of alkoxide solutions. For these ceramics, other methods of particle formation are required. One of the most effective methods for the production of fine, ca. $0.05-\mu$, particles of SiC involves laser-induced reaction of $SiH_4$ and $CH_4$. Conveniently, the $CO_2$ laser employed emits most strongly at $10.6\mu$ a strong vibrational absorption of the reactants. Using focused laser radiation, temperatures of $1500°$ can be developed in $10^{-4}$ sec to provide complete conversion to an unagglomerated ceramic powder which compacts well. The green bodies sinter to dense ceramic bodies with the usual compliment of voids, most probably because of the dispersion in particle size. More recently, mixed SiC-$Si_3N_4$ powders have been produced by the same process using $[(CH_3)_3Si]_2NH$ gas as a ceramic precursor. Unfortunately, incomplete reaction in the gas phase precluded complete conversion to ceramic, and agglomerates formed through the cohesion of "sticky" polymer layers that remained on the ceramic particle surfaces. Metal oxides can also be produced by simple resistance heating of a tube through which is passed a metal alkoxide.

Another powerful technique for the production of more controlled particle sizes is through an aerosol. Typically, alkoxide vapor is generated, condensed, and reacted with a counterflowing, wet, inert gas stream. Alternatively, the aerosol can be made by any number of nebulizing techniques such as a piezoelectric excitation of periodic surface instabilities in a layer of liquid or across a stream of liquid.

A difficulty with all the above discussed methods of particle production is that the particles are still not truly monosized when synthesized. Additionally, there is no generic way to produce monosize particles of nonoxide ceramics. It has been found that the present method for particle growth can employ a polymethylmethoacrylate latex of very narrow size distribution as a seed phase for the incorporation of preceramic organometallic. These particle suspensions are then the raw material for introduction into an aerosol dispersor which will separate the particles in a gas stream and permit them to be converted to ceramic. Swelling of monosized latex particles of small size ($0.1-0.5\mu$) with monomer and subsequent polymerization permits the formation of large $1-10\mu$ monosize particles ($\pm 1\%$ variation in diameter). Previous research has been conducted on the swelling of polystyrene particles with organic compounds. These previous techniques require pre-swelling treatment and were further improved to a one step method through the emulsions. This work has involved the swelling of organic particles with organic reagents only. The process described herein is designed to produce ceramic not organic particles.

SUMMARY OF THE INVENTION

Monosized latex polymer particles are suspended in a dilute solution of a polymeric surfactant in a highly polar solvent. An excess of emulsified organometallic ceramic precursor, also in a dilute solution of a polymeric surfactant in a highly polar solvent, is added to the latex suspension and mixed thoroughly resulting in the incorporation or swelling of the ceramic precursor into the latex sphere. After the sphere has been swollen by the precursor, water is added to the latex-organometallic suspension to produce an metallic oxide of uniform size. The latex material is removed by thermolysis to yield monosized ceramic particles.

DESCRIPTION OF THE PREFERRED EMBODIMENTS

The preferred method for producing the monosized ceramic particles of the present invention is described below. Monosized latex polymer particles are suspended in a dilute solution of a polymeric surfactant in a highly polar solvent. In one case, 2.02 μm diameter poly(vinyltoluene) particles were suspended in a 0.01% poly(vinyl-N-pyrrolidone) (PVNP) solution in dimethylsulfoxide (DMSO).

A sufficient quantity of an emulsified organometallic ceramic precursor also in a dilute solution of a polymeric surfactant in a highly polar solvent is added to the latex suspension such that an excess of the organometallic ceramic precursor is present in the latex-organometallic suspension. In the same case as above, an emulsified 10% tantalum ethoxide in 0.5% PVNP/DMSO solution was added to the poly(vinyltoluene) suspension such that an approximate ten fold excess of tantalum ethoxide was present. The organometallic may be of the formula $MR_n$ wherein M is metal atom, R is an alkyl, alkoxy, or aryloxy group, and n is a whole integer from 1 to 8. Metals which can comprise the metal constituent of the compounds to be employed in this invention are, in general, any metals of Groups II-A through V-A of the Periodic Chart of the Elements. However, metal compounds containing the following metals are preferred: beryllium, titanium, zirconium, niobium, tantalum, chromium, molybdenum, tungsten, cobalt, nickel, copper, zinc, cadmium, aluminum, tin, and lead. Zirconium, tantalum, aluminum, and yttrium are especially preferred.

Alkoxides which can comprise the organic constituent of the compound to be employed in this invention are, in general, branched and linear alkoxides with up to 10 carbon atoms. However, isopropoxides are preferred. As an example, the alkoxide zirconium isopropoxide, $Zr(O-isoC_3H_7)_4$, is utilized and is especially useful because of its commercial availability.

The latex-organometallic suspension is then thoroughly mixed and ultrasonicated to cause the organometallic ceramic precursor to impregnate, be incorporated into, and swell within the latex sphere. In the example given, the latex-organometallic suspension was mixed and ultrasonicated for 12 hours at 50°C.

After the latex sphere has been swollen by the organometallic ceramic precursor, sufficient water is then added to the latex-organometallic suspension to produce the metallic oxide. In the example, tantalum oxide was formed through the hydrolysis/condensation polymerization of the tantalum ethoxide.

Next, the polymer latex is removed. In the instant example, the latex was removed by thermolysis resulting from casting material on a glass slide and heating the material to 800°C. The removal of the polymer latex leaves behind a ceramic bead or shell, depending on the depth to which the organometallic ceramic precursor has penetrated the latex bead. The complete removal of the latex material can be verified by Fourier transform infrared.

The depth of penetration of the organometallic precursor into the latex bead is a function of both time of contact (in this example, 12 hours at 50°C.) and the amount of water present in the bead. If the bead is wet, a shell of ceramic is produced. If the bead is dry, a solid ceramic particle is produced.

While the invention has been described in connection with a preferred embodiment, it is not intended to limit the invention to the particular form set forth, but, on the contrary, it is intended to cover alternatives, modifications, and equivalents, as may be included within the spirit and scope of the invention as defined by the appended claims.

I claim:

1. A method for producing ceramic particles comprising the steps of:
   a. suspending polymer latex particles in a dilute solution of a first polymeric surfactant in a first highly polar solvent;
   b. adding to said latex suspension an emulsified organometallic ceramic precursor in a dilute solution of a second polymeric surfactant in a second highly polar solvent;
   c. mixing said latex-organometallic suspension such that said organometallic ceramic precursor is impregnated into said latex particle;
   d. adding sufficient water to said latex-organometallic suspension to produce metallic oxide particles in solution;
   e. removing said latex from said metallic oxide particle solution by thermolysis.

2. The method of claim 1 wherein said latex particles are poly(vinyltoluene).

3. The method of claim 2 wherein said organometallic presursor is tantalum ethoxide.

4. A method of producing ceramic particles comprising the steps of:
   a. suspending poly(vinyltoluene) particles in a 0.01% poly(vinyl-N-pyrrolidone solution in dimethylsulfoxide;
   b. adding to said poly(vinyltoluene) suspension sufficient quantity of emulsified 10% tantalum ethoxide in a 0.05% poly(vinyl-N-pyrrolidone solution in dimethoylsulfoxide such that an approximate ten fold excess of tantalum ethoxide is present;
   c. mixing and ultrasonicating said poly(vinyltoluene)-tantalum ethoxide suspension for approximately 12 hours at 50°C. such that a portion of said tantalum ethoxide is impregnated into said poly(vinyltoluene) particles;
   d. adding sufficient water to said poly(vinyltoluene)-tantalum ethoxide suspension to oxidize said tantalum ethoxide to tantalum oxide;
   e. removing said poly(vinyltoluene) from said tantalum oxide by thermolysis.

5. The method of claim 1 wherein said first polymeric surfactant is of the same composition as said second polymeric surfactant and said first highly polar solvent is of the same composition as said second highly polar solvent.

* * * * *